United States Patent
Po

(10) Patent No.: US 10,564,380 B2
(45) Date of Patent: Feb. 18, 2020

(54) POSITIONAL ALIGNMENT MECHANISM FOR A LENS ASSEMBLY

(71) Applicant: RAYTHEON COMPANY, Waltham, MA (US)

(72) Inventor: Li Chiao Po, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 84 days.

(21) Appl. No.: 15/202,276

(22) Filed: Jul. 5, 2016

(65) Prior Publication Data

US 2018/0011278 A1    Jan. 11, 2018

(51) Int. Cl.
| | | |
|---|---|---|
| *G02B 7/00* | (2006.01) | |
| *G02B 7/02* | (2006.01) | |
| *G02B 7/04* | (2006.01) | |

(52) U.S. Cl.
CPC .............. *G02B 7/005* (2013.01); *G02B 7/02* (2013.01); *G02B 7/023* (2013.01); *G02B 7/04* (2013.01)

(58) Field of Classification Search
CPC ...... G02B 25/002; G02B 27/021; G02B 7/04; G02B 15/04; G02B 25/02; G02B 23/16; G02B 25/005; G02B 7/026; G02B 7/10; G02B 13/08; G02B 23/00; G02B 23/08; G02B 25/008; G02B 27/02; G02B 27/025; G02B 27/04; G02B 27/08; G02B 3/0006
See application file for complete search history.

(56) References Cited

U.S. PATENT DOCUMENTS

| | | | |
|---|---|---|---|
| 5,400,133 A | 3/1995 | Hinton et al. | |
| 2004/0189969 A1* | 9/2004 | Mizuno | G02B 7/023 355/67 |
| 2004/0257682 A1* | 12/2004 | Watts | G02B 7/008 359/823 |
| 2005/0275740 A1* | 12/2005 | Nagano | G02B 7/08 348/335 |
| 2006/0082907 A1* | 4/2006 | Murasato | G02B 7/026 359/819 |
| 2008/0080069 A1* | 4/2008 | Masuda | G02B 7/023 359/813 |
| 2011/0196429 A1* | 8/2011 | Hua | A61B 17/7001 606/279 |

FOREIGN PATENT DOCUMENTS

| | | | | |
|---|---|---|---|---|
| CN | 204314595 | * | 5/2015 | ............ G03B 29/00 |
| CN | 204314595 U | | 5/2015 | |

OTHER PUBLICATIONS

International Search Report and Written Opinion for application No. PCT/US2017/022449 dated Dec. 8, 2017.

* cited by examiner

*Primary Examiner* — William R Alexander
*Assistant Examiner* — Sharrief I Broome
(74) *Attorney, Agent, or Firm* — Lando & Anastasi, LLP

(57) ABSTRACT

An alignment mechanism to position and focus a lens assembly includes a housing and an eccentric shaft supported by the housing. The eccentric shaft is configured to rotate with respect to the housing. The alignment mechanism further includes a lens assembly having a bracket coupled to the eccentric shaft, and an actuator assembly, coupled to the bracket of the lens assembly and configured to rotate the lens assembly about the eccentric shaft. The alignment mechanism further includes at least one thrust drive nut mounted on the eccentric shaft, the at least one thrust drive nut being (Continued)

configured to move the eccentric shaft and the bracket of the lens assembly in a z-axis direction.

20 Claims, 8 Drawing Sheets

POSITIONAL ALIGNMENT MECHANISM FOR A LENS ASSEMBLY

FEDERALLY SPONSORED RESEARCH

This invention was made with government support under Grant No. H94003-04-D-0006-0228 awarded by Air Force Research Laboratory. The U.S. government has certain rights in this invention.

BACKGROUND OF THE INVENTION

Modern tactical aircraft use a number of imaging aids to assist the crew in viewing a scene, selecting targets in the scene, and directing weapons against the selected targets. Visible, infrared, and/or specific spectral bands imaging devices are used in various applications to form an image of the scene. The type of imaging spectrum depends upon the mission, weather conditions, the nature of the scene, as well as other factors.

One form of an infrared optical system includes several lenses made of infrared-transparent lens materials. The lenses are arranged at proper positions by an alignment mechanism along an optical path to achieve desired effects by a lens mount assembly. It is critical that the lenses be properly aligned by the mechanism, which often is difficult to access to adjust the lenses.

SUMMARY OF INVENTION

One aspect of the present disclosure is directed to an alignment mechanism to position and focus a lens assembly. In one embodiment, the alignment mechanism comprises a housing and an eccentric shaft supported by the housing. The eccentric shaft is configured to rotate with respect to the housing. The alignment mechanism further comprises a lens assembly comprising a bracket coupled to the eccentric shaft, and an actuator assembly, coupled to the bracket of the lens assembly and configured to rotate the lens assembly about the eccentric shaft. The alignment mechanism further comprises at least one thrust drive nut mounted on the eccentric shaft, the at least one thrust drive nut being configured to move the eccentric shaft and the bracket of the lens assembly in a z-axis direction.

Embodiments of the alignment mechanism further may include two thrust drive nuts spaced apart from one another on the eccentric shaft. The two thrust drive nuts may be threadably secured to the eccentric shaft by fine pitch threads. The bracket of the lens assembly may be secured to the eccentric shaft by two angular contact bearings. The eccentric shaft may include an opening formed therein to receive a tool configured to hold the eccentric shaft and the two thrust drive nuts angularly in phase while rotating the shaft with the tool. The tool further may be configured to hold the eccentric shaft in place while rotating the thrust drive nuts to lock down the eccentric shaft. The actuator assembly may be a Geneva-type actuator. The housing may include at least one set screw to secure the eccentric shaft in place with respect to the housing. The alignment mechanism further may comprise at least one bearing pre-load nut positioned adjacent to one of the two angular contact bearings. The at least one bearing pre-load nut may comprise two bearing pre-load nuts, a first bearing pre-load nut being positioned adjacent a first of the two angular contact bearings and a second bearing pre-load nut being positioned adjacent a second of the two angular contact bearings.

Another aspect of the present disclosure is directed to a method of assembling an alignment mechanism used to move a lens assembly in x-axis, y-axis and z-axis directions. In one embodiment, the method comprises: establishing a boresight, field of vision of the lens assembly; adjusting a centration position of the lens assembly by rotating an eccentric shaft of the alignment mechanism; rotating at least one thrust drive nut of the alignment mechanism to adjust the z-axis direction to achieve a desired focus; and locking the at least one thrust drive nut in place.

Embodiments of the method further may include an adjustment tool to maintain an angular position of the eccentric shaft. Locking the at least one thrust drive nut in place may comprise rotating two thrust drive nuts in opposite directions with the adjustment tool to lock down the focus of the lens assembly. The method further may comprise locking at least one set screw. The method further may comprise staking the at least one thrust drive nut in place. The staking the at least one thrust drive nut in place may be achieved by a fast dry epoxy. The at least one thrust drive nut may include two thrust drive nuts spaced apart from one another on the eccentric shaft. The method further may comprise threadably securing the two thrust drive nuts to the eccentric shaft by fine pitch threads. The eccentric shaft may include an opening formed therein to receive a tool configured to keep the eccentric shaft and the two thrust drive nuts angularly in phase while rotating the eccentric shaft during alignment. An adjustment tool further may be configured to hold the eccentric shaft in a desired angular position while rotating the thrust drive nuts.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Embodiments of the present disclosure are directed to a compact, three-axis positional alignment mechanism that utilizes an eccentric shaft and two fine pitch thrust drive nuts to provide three-axis alignment adjustments of a lens assembly. The alignment mechanism is designed to overcome issues associated with prior art mechanisms, including, but not limited to difficulties in accessing adjustment features for a rotational tumbler, difficulties in meeting stringent centration and focus requirements, high rotational inertia causing longer switch time, and too many alignment adjustment features. The alignment mechanism is designed to fit into a volumetric form factor of an optical switch mechanism. The alignment mechanism includes an adjustment tool that is designed to easily manipulate the components of the alignment mechanism to align a translating optical mass of the lens assembly. The alignment mechanism is configured to shorten switch time by reducing the inertial mass of the translated assembly. The main components of the alignment mechanism are collocated at the rotational axis instead of being dispersed within the optical switch mechanism. The eccentric shaft of the alignment mechanism is configured to be manipulated to adjust the lens assembly in the x-axis, y-axis and z-axis directions. The alignment mechanism improves the effect of cross talk between the degrees of freedom, which can be monitored and taken into account at a point of lock down thus achieving a higher level of accuracy.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
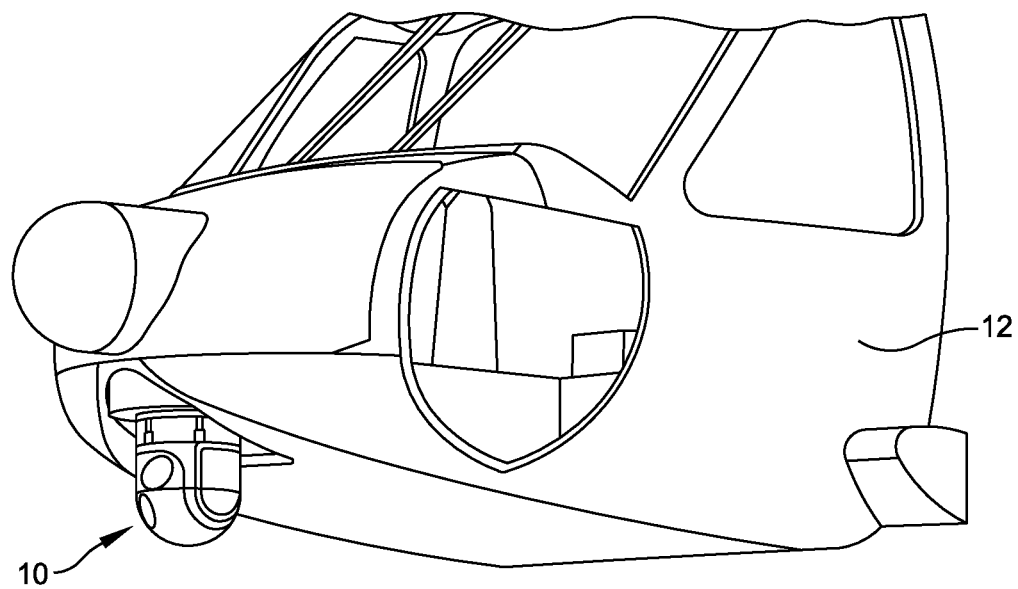
FIG. 1 is a perspective view of an aircraft having an optical platform.
Figure 2:
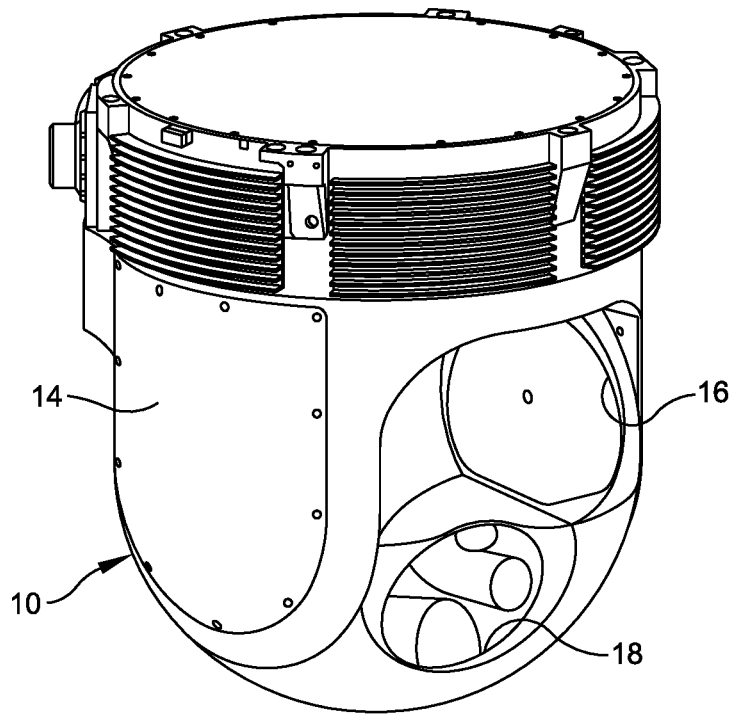
FIG. 2 is a perspective view of the optical platform configured to support an optical assembly.

Referring to the drawings, and more particularly to FIGS. 1 and 2, an optical platform, generally indicated at 10, is shown mounted on an aircraft 12, such as a helicopter. As shown, the optical platform 10 is positioned at the front of the aircraft 12, and includes a semi-spherically-shaped housing 14 configured to support a number of optical devices. In one embodiment, the housing 14 of the optical platform 10 is configured to include a light detection and ranging ("LADAR") assembly window 16 and a forward looking infrared ("FLIR") window 18, which respectively support a LADAR assembly and a FLIR camera (neither shown). It should be understood that the optical platform 10 may be configured to support any number of optical devices having lens assemblies requiring support within the housing 14 of the optical platform 10.

Figure 3:
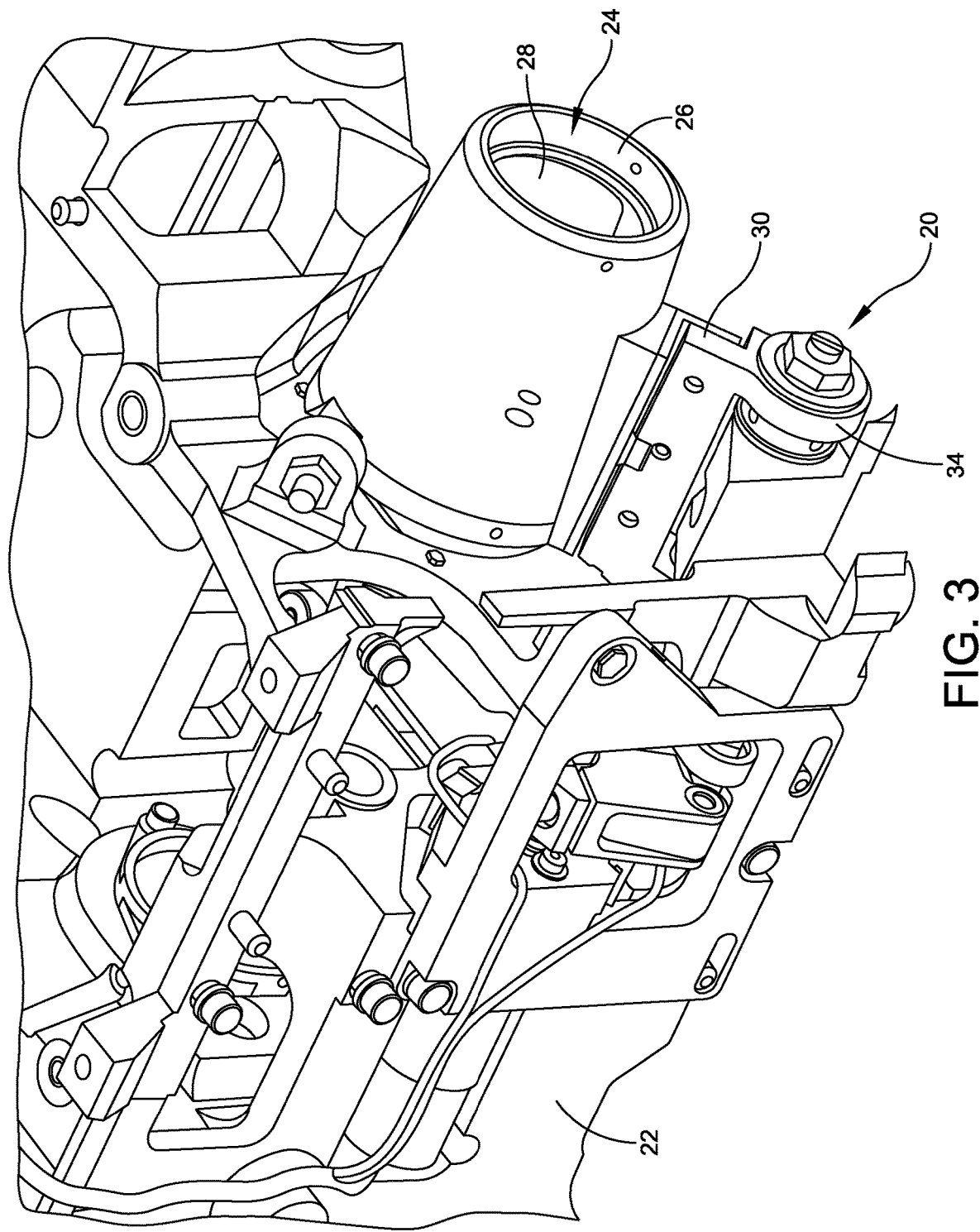
FIG. 3 is a perspective view of a lens assembly secured to the optical platform.
Figure 4:
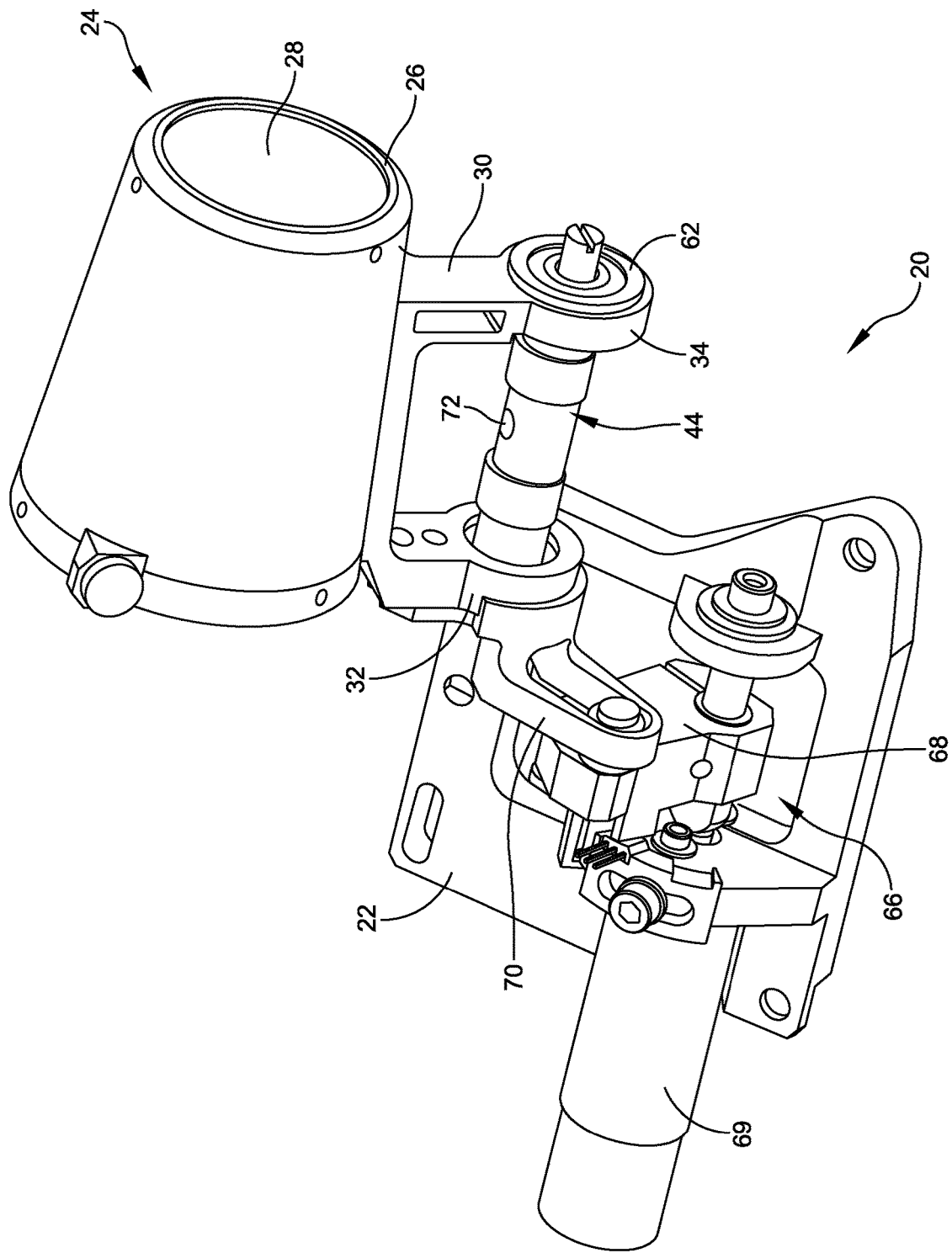
FIG. 4 is a perspective view a compact, three-axis positional alignment mechanism of an embodiment of the present disclosure that is used to adjust a position of a lens assembly.

Referring to FIG. 3, in one embodiment, behind the FLIR window 18 is located a compact, 3-axis positional alignment mechanism, generally indicated at 20, that is secured to a frame 22 of the optical platform 10. As will be described in greater detail below, the alignment mechanism 20 is configured to position a lens assembly, generally indicated at 24, in a desired position. In a certain embodiment, the lens assembly 24 can be configured to include a lens housing 26 and a plurality of lenses 28. In one embodiment, the lens housing 26 of the lens assembly 24 are fabricated from a metal alloy, such as 6061 aluminum alloy and are approximately 3.0 inches in diameter. It should be noted that the lens housing 26 may be fabricated from any type of suitable material and be sized to accommodate a desired lens size.

Referring to FIGS. 3-6 and 8, the lens assembly further includes a mounting bracket 30 secured to the lens housing 26. In one embodiment, a mounting block 31 may be provided as an interface to mount the lens housing 26 to the mounting bracket 30. The mounting bracket 30 can be manipulated by the alignment mechanism 20 to move the lens housing 26 and the lenses 28 to achieve positional alignment and focus of the lenses 28. As shown, the mounting bracket 30 is generally U-shaped in construction and includes two circular portions 32, 34, which are constructed to be coupled to components of the alignment mechanism 20.

In one embodiment, the alignment mechanism 20 includes a housing, generally indicated at 36, to support the components of the alignment mechanism. As shown, the housing 36 includes a base 38 and two bearing blocks 40, 42 integrally formed with the base 38. The base 38 is suitably secured to the housing 14 of the optical platform 10, for example, by machine screw fasteners or the like. The bearing blocks 40, 42 of the housing 36 are configured to support an eccentric shaft, generally indicated at 44, which is positioned within openings of the bearing blocks. As will be described in greater detail below, the eccentric shaft 44 includes a body 46 that is configured to rotate with respect to the housing and provides the adjustment of the lens housing 26 required to accurately position the lenses 28 of the lens assembly 24.

In embodiments, the body 46 of the eccentric shaft 44 includes two end threaded portions 48, 50, two bearing engagement portions 52, 54, and two fine pitch threaded portions 56, 58. The two end portions 48, 50 of the body 46 of the eccentric shaft 44 are each secured in place with respect to the housing 36 by two bearing pre-load nuts, each indicated at 60. Each bearing pre-load nut 60 is threadaby secured to its respective end portion. The two bearing engagement portions 52, 54 of the body 46 of the eccentric shaft 44 are configured to house angular contact bearings 62, which are press fit on the bearing engagement portions 52, 54. The angular contact bearings 62 are received within openings formed in the circular portions 32, 34 of the mounting bracket 30 of the lens assembly 24 to secure the lens assembly to the alignment mechanism 20. As a result, any rotation of the eccentric shaft 44 will cause predictable changes in a position of the lens assembly 24 slightly in the x-axis direction and mainly in the y-axis direction. The threaded portions 56, 58 of the body 46 of the eccentric shaft 44 are each configured to threadably receive a thrust drive nut, each indicated at 64, which together are configured to move the eccentric shaft and the mounting bracket 30 of the lens assembly 24 in the z-axis direction.

In embodiments of the invention, the alignment mechanism 20 further includes an actuator assembly, generally indicated at 66, linked to the mounting bracket 30 of the lens assembly 24 by a sliding crank configuration. In one embodiment, the actuator assembly 66 embodies a Geneva-type actuator, which includes a spring-loaded actuator arm 68 and a slot arm 70 connected to the mounting bracket 30 of the lens assembly 24. The arrangement is such that the spring-loaded actuator arm 68 is driven by a motor 69, which in turn rotates the slot arm 70 to rotate the mounting bracket 30 and the lens assembly 24. The eccentric shaft 44 is secured during actuation as the center of rotation. During alignment, rotation of the eccentric shaft will cause movement of the lens assembly 24 slightly in the x-axis and mainly in the y-axis directions to satisfy the alignment requirements.

As mentioned above, the alignment mechanism 20 includes two thrust drive nuts 64, which are spaced apart from one another on the body 46 of the eccentric shaft 44. The thrust drive nuts 64 are threadably secured to the eccentric shaft 44 by fine pitch threads formed on the inner surfaces of the thrust drive nuts 64 and on the threaded portions 56, 58 of the body 46 of the eccentric shaft 44. When the thrust drive nuts 64 are rotated in the same direction, the eccentric shaft 44 is caused to move in the z-axis direction depending on the rotational direction of the thrust drive nuts 64. This movement of the eccentric shaft 44 in turn causes the movement of the angular contact bearings 62 to move the mounting bracket 30 and the lens assembly 24 in the z-axis direction as well to focus the lens assembly 24. Although two thrust drive nuts 64 are shown and described, it should be understood that the movement of the eccentric shaft 44 in the z-axis direction could be achieved by a single thrust drive nut.

Figure 9:
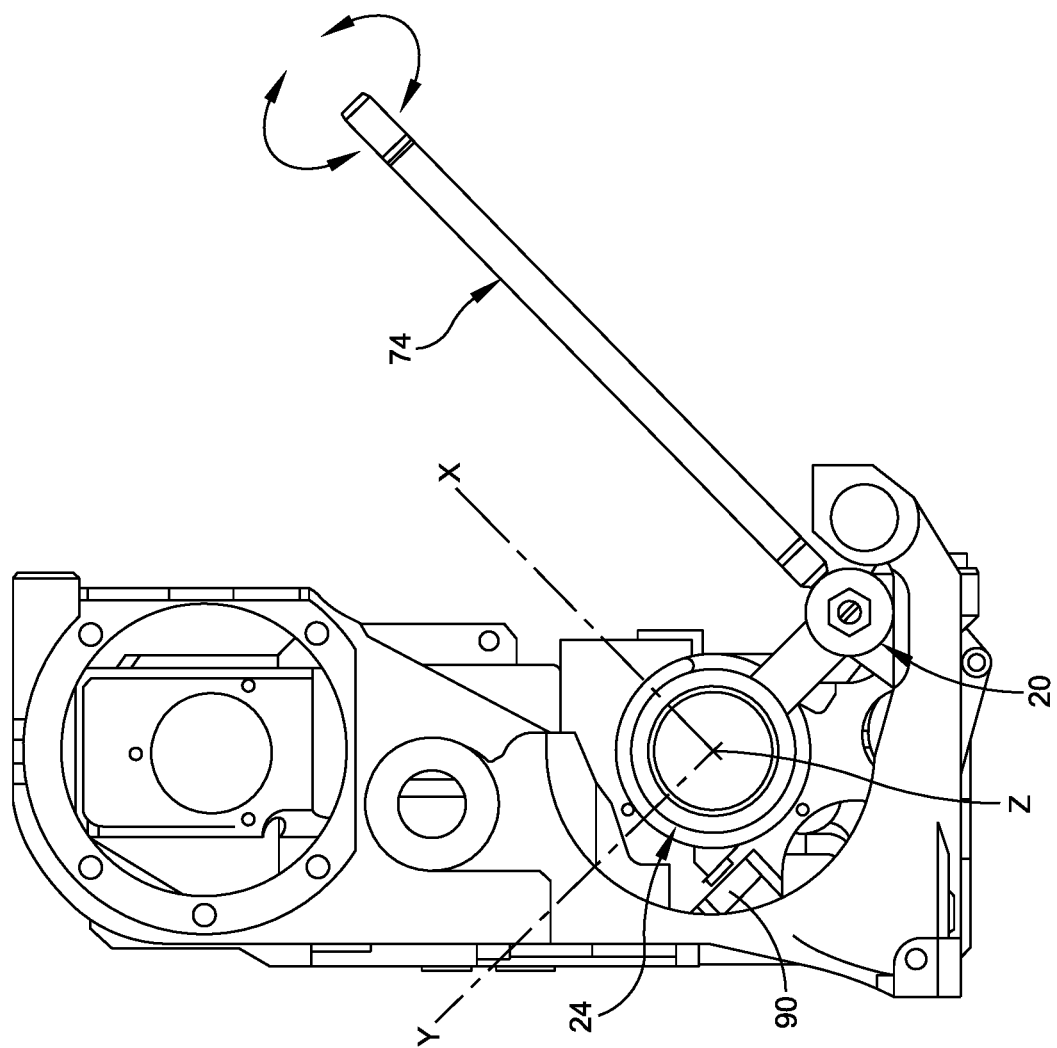
FIG. 9 is an elevational view of the alignment mechanism that is being manipulated by the tool.

Referring to FIGS. 3-8 as well as FIG. 9, in order to maintain the position of the eccentric shaft 44 in the x-axis direction and the y-axis direction, the eccentric shaft 44 includes several openings, each indicated at 72, formed in the body 46 of the eccentric shaft 44 between the threaded portions 56, 58 to receive an adjustment tool, generally indicated at 74, which is configured to hold the eccentric shaft 44 in place when rotating the thrust drive nuts 64. In one embodiment, the body 46 of the eccentric shaft 44 includes four openings 72; however, the eccentric shaft 44 may be configured with any number of openings 72 to allow the adjustment tool 74 to access the opening 72 within the space provided.

As shown, the adjustment tool 74 includes an elongated handle 76 and a foot 78 provided at an end of the handle 76. The foot 78 of the adjustment tool 74 includes a larger cylindrical member 80 that is sized to enter into and be received within the opening 72 (or openings). The foot 78 of the adjustment tool 74 further includes two smaller cylindrical members, each indicated at 82, which are provided at respective ends of the foot to engage the thrust drive nuts 64. It should be understood that the opening 72 (or openings) of the eccentric shaft 44 and the larger cylindrical member 80 of the adjustment tool 74 may include any shape that enables the adjustment tool to mate with the eccentric shaft to hold the eccentric shaft in place. For example, the opening 72 may be square-shaped and sized to receive a square-shaped member 80 of the adjustment tool 74. The smaller cylindrical members 80 can embody other shapes as well.

The thrust drive nuts 64 each include a stepped outer surface having recesses 84 interposed between raised portions 86. As shown, when the larger cylindrical member 80 of the adjustment tool 74 enters the opening 72 of the eccentric shaft 44, the two smaller cylindrical members 82 are positioned within the recesses 84 of the stepped outer surfaces of the thrust drive nuts 64. The arrangement is such that the adjustment tool 74 is configured to hold the two thrust drive nuts 64 angularly in phase with the eccentric shaft 44 to keep the shaft in place while rotating the eccentric shaft 44. After the focus position is achieved, the adjustment tool 74 is rotated axially about the handle 76 resulting in the thrust drive nuts 64 being rotated in opposite directions, locking the eccentric shaft 44 in place in the z-axis direction. Reference can be made to FIG. 9, which illustrates the adjustment tool 74 being rotated axially about the handle 76 to rotate the thrust drive nuts 64 in opposite directions.

Figure 5:
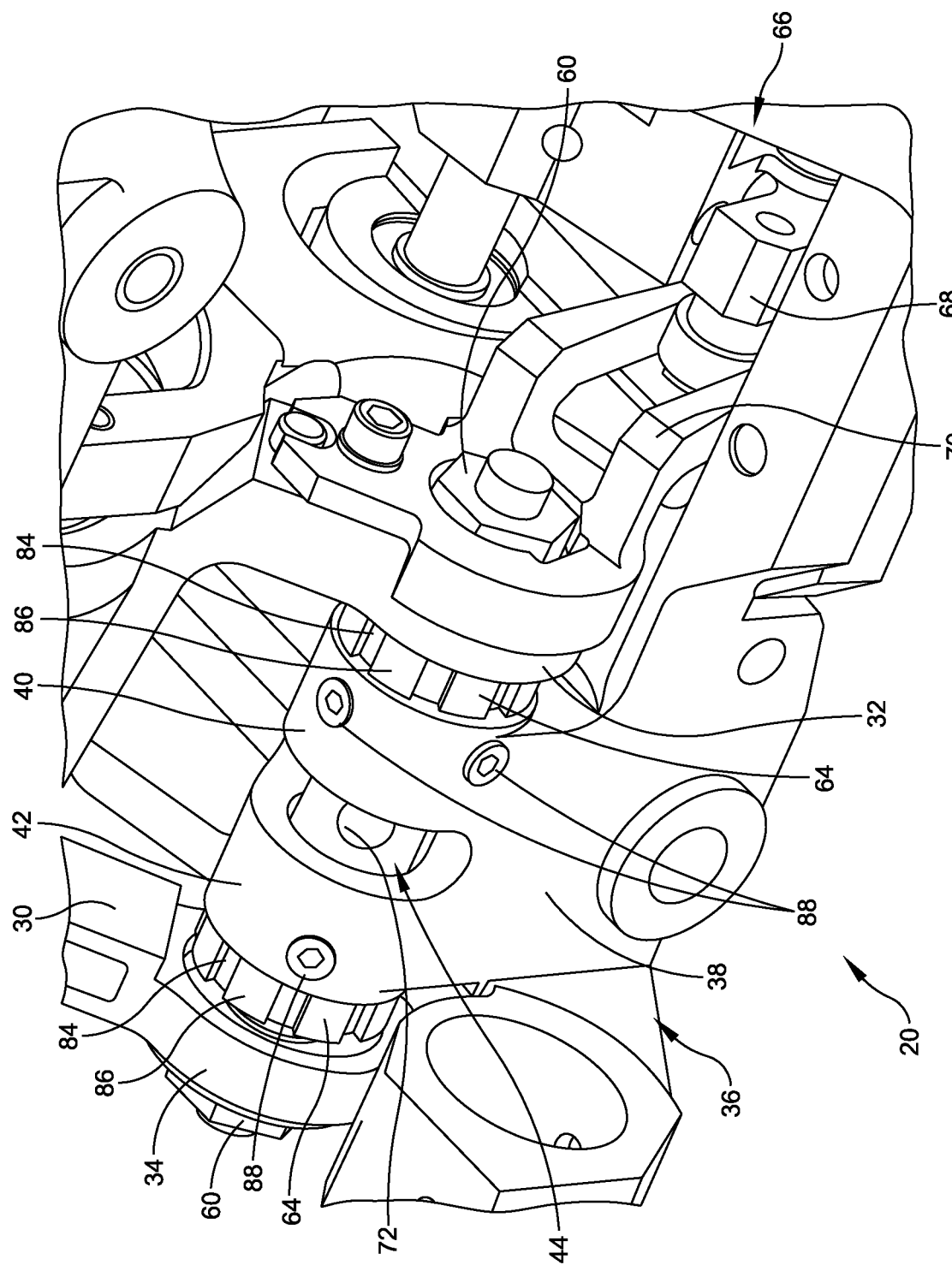
FIG. 5 is a perspective view of the alignment mechanism.
Figure 6:
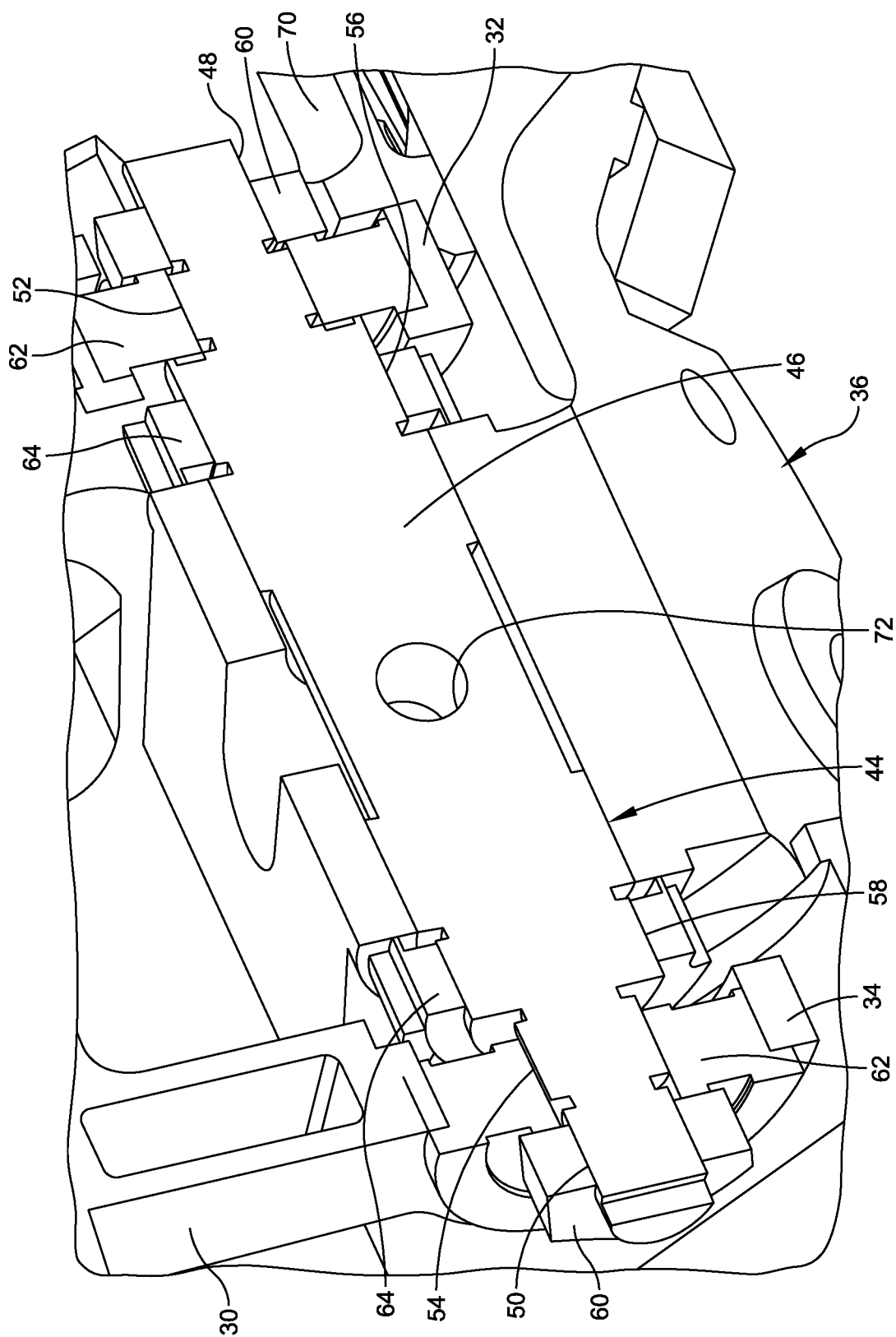
FIG. 6 is an enlarged cross-sectional perspective view of the alignment mechanism.
Figure 7:
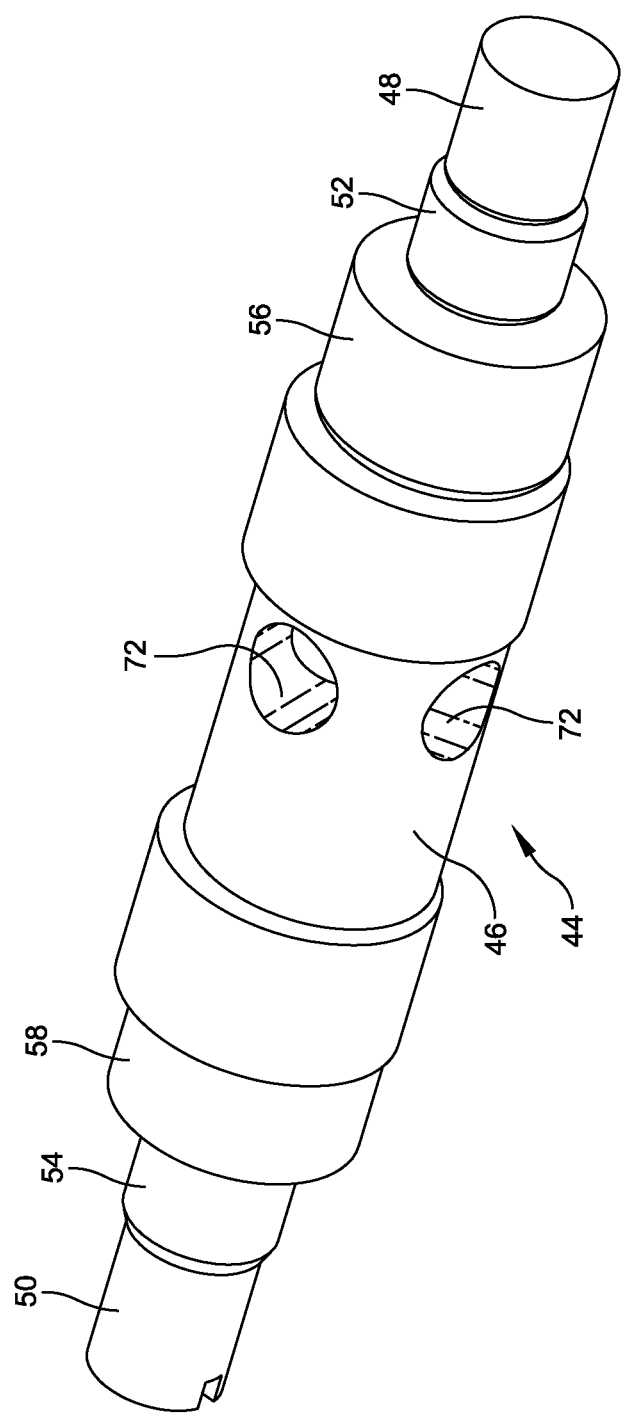
FIG. 7 is a perspective view of an eccentric shaft of the alignment mechanism.
Figure 8:
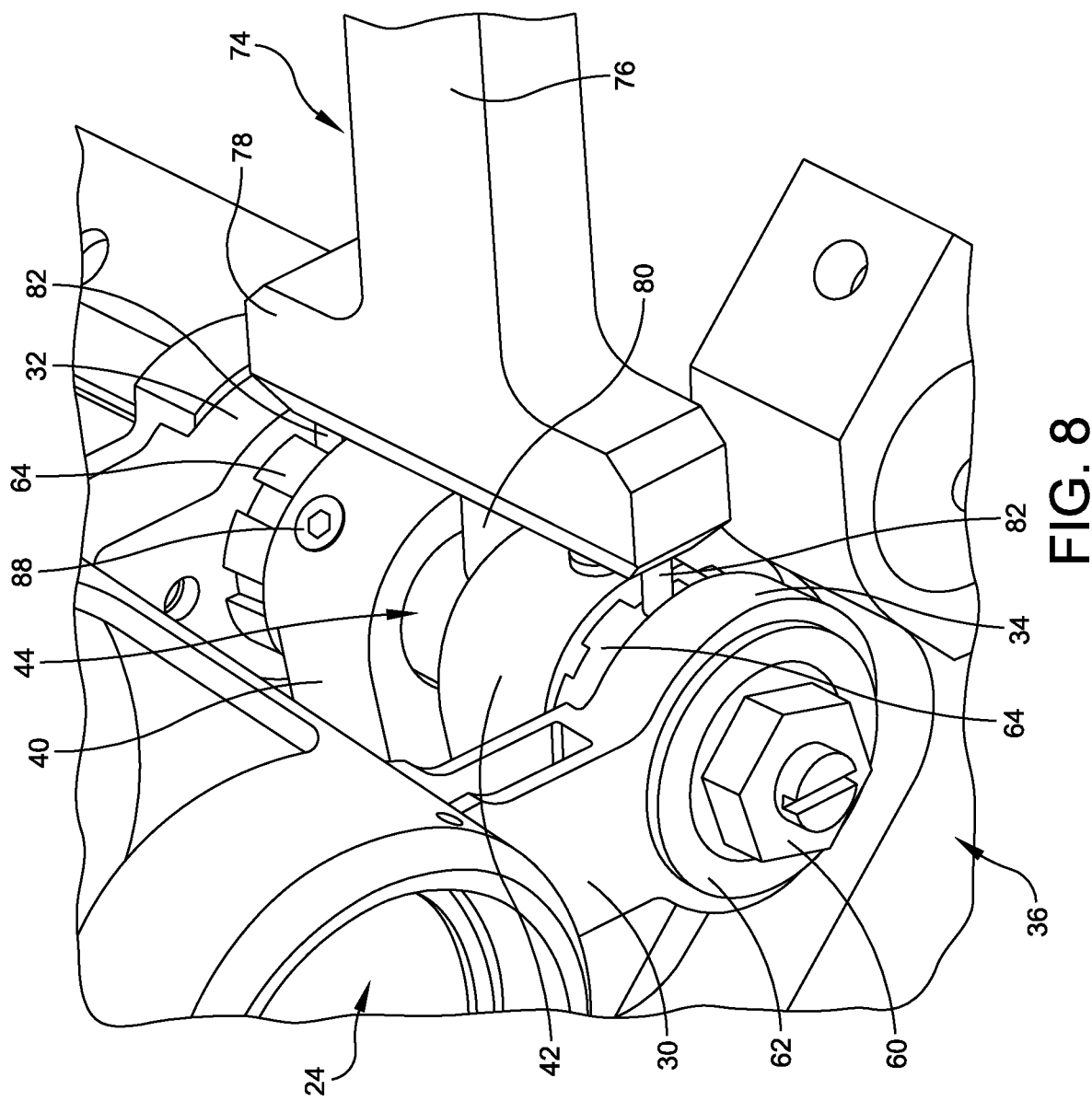
FIG. 8 is an enlarged perspective view of a portion of the alignment mechanism that is being manipulated by a tool.

The alignment mechanism 20 of embodiments of the present disclosure further include several set screws, each indicated at 88, to lock the body 46 of the eccentric shaft 44 in place after adjusting the eccentric shaft and the lens assembly 24 in a desired position. As shown in FIG. 5, three set screws 88 are provided in the bearing blocks 40, 42 of the housing 36. It should be understood that any number of set screws 88 can be provided to secure the body 46 of the eccentric shaft 44 in place with respect to the housing 36 once secured in a fixed position.

To assemble the alignment mechanism 20, the boresight field of vision of the lens assembly 24 is established. The set screws 88 are loosened, and the alignment mechanism 20 is locked in an "in-field" or working position. The eccentric shaft 44 of the alignment mechanism 20 is rotated to adjust the bore sight position, which enables the y-axis position to be adjusted with minimal effect to the x-axis position. The x-axis position is adjusted after the y-axis position is adjusted with an x-axis stop screw 90 (FIG. 9). Next, the focus of the lens assembly 24 is established. The thrust drive nuts 64 are rotated simultaneously to achieve a desired focus while the adjustment tool 74 maintains the angular position of the eccentric shaft 44. The thrust drive nuts 64 are next rotated opposite directions by rotating the adjustment tool 74 to lock down a focus of the lens assembly 24. The set screws 88 are torqued down, and the thrust drive nuts 64 are staked using a fast dry epoxy.

It should be understood that the alignment mechanism of embodiments of the present disclosure has a compact package created by the eccentric shaft, the two thrust drive nuts with fine pitch thread, and a Geneva-type actuator to achieve a three-axis adjustable optical tumbler.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An alignment mechanism to position and focus a lens assembly, the alignment mechanism comprising:
   a housing;
   an eccentric shaft supported by the housing, the eccentric shaft being configured to rotate with respect to the housing;
   a lens assembly comprising a bracket coupled to the eccentric shaft, the eccentric shaft further being configured to cause the movement of the lens assembly in the x-axis and y-axis directions when rotating the eccentric shaft;

an actuator assembly, coupled to the bracket of the lens assembly and configured to rotate the lens assembly about the eccentric shaft; and at least one thrust drive nut mounted on the eccentric shaft, the at least one thrust drive nut being configured to move the eccentric shaft and the bracket of the lens assembly in a z-axis direction when rotating the at least one thrust drive nut.

2. The alignment mechanism of claim 1, wherein the at least one thrust drive nut comprises two thrust drive nuts spaced apart from one another on the eccentric shaft.

3. The alignment mechanism of claim 2, wherein the two thrust drive nuts are threadably secured to threaded portions of the eccentric shaft.

4. The alignment mechanism of claim 3, wherein the bracket of the lens assembly is secured to the eccentric shaft by two angular contact bearings.

5. The alignment mechanism of claim 3, wherein the eccentric shaft includes an opening formed therein to receive a tool configured to hold the eccentric shaft and the two thrust drive nuts angularly in phase while rotating the eccentric shaft with the tool.

6. The alignment mechanism of claim 5, wherein the tool further is configured to hold the eccentric shaft in place while rotating the thrust drive nuts to lock down the eccentric shaft.

7. The alignment mechanism of claim 4, wherein the actuator assembly is a Geneva-type actuator.

8. The alignment mechanism of claim 4, wherein the housing includes at least one set screw to secure the eccentric shaft in place with respect to the housing.

9. The alignment mechanism of claim 4, further comprising at least one bearing pre-load nut positioned adjacent to one of the two angular contact bearings.

10. The alignment mechanism of claim 9, wherein the at least one bearing pre-load nut comprises two bearing pre-load nuts, a first bearing pre-load nut being positioned adjacent a first of the two angular contact bearings and a second bearing pre-load nut being positioned adjacent a second of the two angular contact bearings.

11. A method of assembling an alignment mechanism used to move a lens assembly in x-axis, y-axis and z-axis directions, the method comprising:

establishing a boresight, field of vision of the lens assembly;

adjusting a centration position of the lens assembly by rotating an eccentric shaft of the alignment mechanism, the eccentric shaft being configured to cause the movement of the lens assembly in the x-axis and y-axis directions when rotating the eccentric shaft;

rotating at least one thrust drive nut of the alignment mechanism to adjust the z-axis direction to achieve a desired focus, the at least one thrust drive nut being configured to move the eccentric shaft and the bracket of the lens assembly in a z-axis direction when rotating the at least one thrust drive nut; and locking the at least one thrust drive nut in place.

12. The method of claim 11, wherein an adjustment tool maintains an angular position of the eccentric shaft.

13. The method of claim 12, wherein locking the at least one thrust drive nut in place comprises rotating two thrust drive nuts in opposite directions with the adjustment tool to lock down the focus of the lens assembly.

14. The method of claim 11, further comprising locking at least one set screw.

15. The method of claim 14, further comprising staking the at least one thrust drive nut in place.

16. The method of claim 15, wherein the staking the at least one thrust drive nut in place is achieved by a fast dry epoxy.

17. The method of claim 11, wherein the at least one thrust drive nut includes two thrust drive nuts spaced apart from one another on the eccentric shaft.

18. The method of claim 17, further comprising threadably securing the two thrust drive nuts to threaded portions of the eccentric shaft.

19. The method of claim 18, wherein the eccentric shaft includes an opening formed therein to receive a tool configured to keep the eccentric shaft and the two thrust drive nuts angularly in phase while rotating the eccentric shaft during alignment.

20. The method of claim 19, wherein an adjustment tool further is configured to hold the eccentric shaft in a desired angular position while rotating the thrust drive nuts.

\* \* \* \* \*